Figure 1:
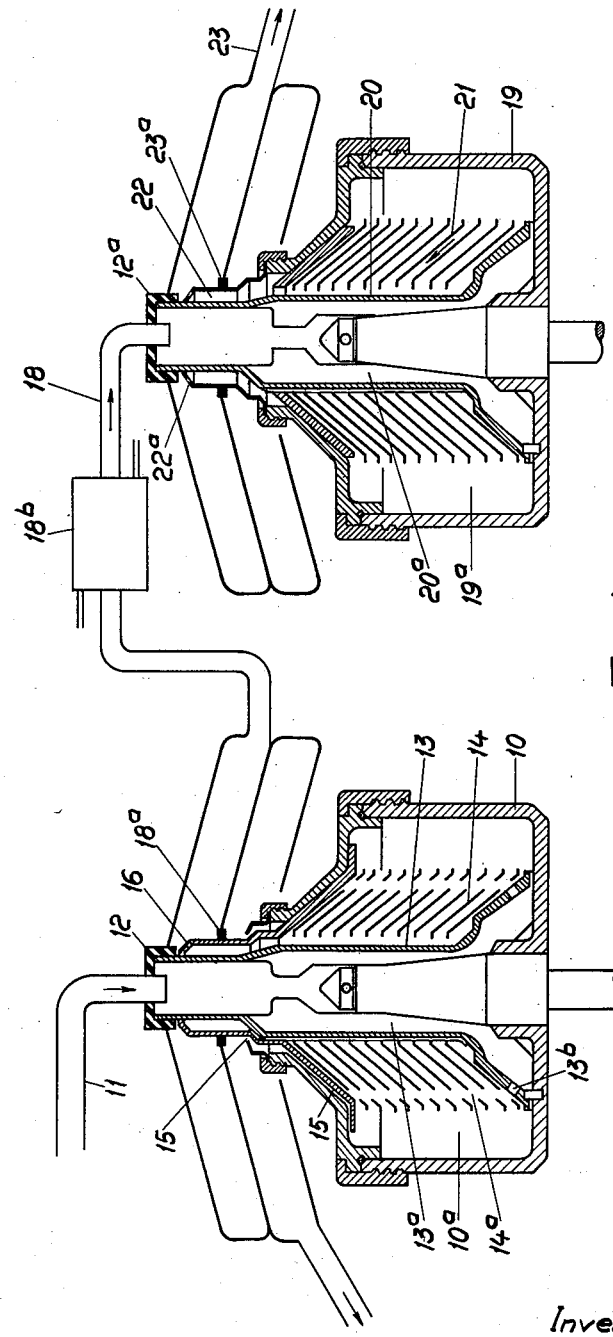

Oct. 23, 1951  G. H. ANDERSSON  2,572,425
CENTRIFUGAL SEPARATION OF HEAVY BOILER OIL
Filed Aug. 19, 1948  2 SHEETS—SHEET 1

Inventor:
Gustav Harry Andersson
By Davis, Hoxie, Faithfull
Attorneys

Oct. 23, 1951 G. H. ANDERSSON 2,572,425
CENTRIFUGAL SEPARATION OF HEAVY BOILER OIL
Filed Aug. 19, 1948 2 SHEETS—SHEET 2

Inventor:
Gustav Harry Andersson
By Davis, Hoxier Faithfull
Attorneys

UNITED STATES PATENT OFFICE 2,572,425

CENTRIFUGAL SEPARATION OF HEAVY BOILER OIL

Gustav Harry Andersson, Smedslatten, Sweden, assignor to Aktiebolaget Separator, Stockholm, Sweden, a corporation of Sweden Application August 19, 1948, Serial No. 45,085
In Great Britain August 28, 1947

2 Claims. (Cl. 233—11)

This invention relates to a method and apparatus for so purifying heavy boiler oil that it can be used as a fuel for diesel engines or for gas turbines.

Heavy boiler oil is considerably cheaper than the so-called diesel oil normally used in diesel engines, and for a long time past, attempts have been made to use boiler oil in place of diesel oil. However, owing to the failure to free the boiler oil sufficiently from the solid impurities and water which it contains, its use in diesel engines has caused heavy wear of piston rings and cylinder liners, leading to excessive repair costs.

By the practice of the present invention, it is possible to free the boiler oil from solid impurities and water to a degree sufficient to make it possible to use heavy boiler oil for diesel engines without causing excessive wear. According to the invention, the oil is heated to a temperature high enough to break any emulsion existing in it, whereupon the oil is purified by centrifuging in two stages. In the first stage, water and a considerable part of the solid impurities are removed in a centrifugal bowl provided with arrangements for continuous discharge of water as the heavier component. However, since the specific gravity of the heavy boiler oil of the kind in question is very high and almost as high as that of water, the equilibrium between oil and water in the bowl is unstable so that, for the slightest reason, the border layer between these liquids is displaced radially within wide limits. Such displacement may be caused, for example, if during the separating operation there is a change in the proportion between the amount of oil and water. Small variations in the throughput rate may also entail the same result, and even a change of the separating temperature may cause a displacement.

The displacement of the border layer between the liquids may be reduced by so dimensioning the separate oil and water discharge channels in the bowl that they afford a minimum resistance to the flow of the respective liquids, and by providing members, for example, in the form of wings, which prevent the liquids from slipping. Even when these measures are taken, excessive radial displacement of the boundary layer may sometimes occur. In case the boundary layer is positioned relatively near to the center of the bowl or the axis of rotation, this may result in reduction of the strength of the power field for the separation of solid particles from the oil, and also in reduction of the space within which this power field is effective. Although the oil is sufficiently freed from water when the boundary layer is positioned relatively near to the bowl center, the oil will not then be sufficiently freed from solid particles.

According to the invention, the oil freed from water is therefore treated in a second centrifuging stage in a clarifier type bowl. The characteristic feature of such a bowl is that the oil is forced to pass through a set of discs along their entire radial extent, that is, from the outer edge of the discs to their inner edge. With this secondary treatment of the oil, the heavier solid impurities, for example, ash substances, are with certainty separated completely enough to ensure that the purified oil, when used for fueling diesel engines, does not cause excessive wear.

In the practice of one form of the invention, the purification of boiler oil is considerably improved by carrying out the second separation at a substantially lower temperature than the first separation. After the first separation has been effected, the oil is chilled, or allowed to cool off, so that the asphalt substances dissolved in the oil are precipitated. In the second separation, these substances are removed and they carry with them the extremely fine solid substances left after the first separation. By the use of this improved method, it has been found possible to reduce the content of solid impurities in heavy boiler oil to such an extent that the wear of the cylinder liners and piston rings of diesel engines fueled with the purified oil is no higher than when ordinary diesel oil is used. Tests have shown that the decrease of temperature between the separations should be at least 10° F. The first separation may be carried out at about 180° F., although this temperature will vary according to the viscosity and other qualities of the oil.

Figure 2:
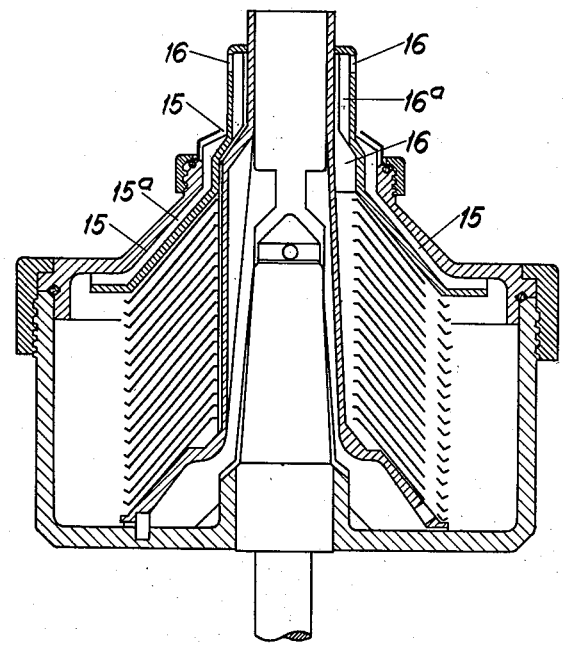

In the accompanying drawings, Fig. 1 is a schematic view, partly in vertical section, of an apparatus for carrying out the new process; and Fig. 2 is an enlarged vertical sectional view of the first-stage centrifugal bowl shown in Fig. 1.

Referring to the drawings, the first stage centrifuge has a centrifugal bowl 10 which receives the boiler oil from a stationary feed pipe 11 connected to the bowl inlet through a flexible air-tight seal 12. From the bowl inlet, the oil passes down through a central distributor 13 having radial wings 13a, and through openings 13b in the distributor to the separating chamber or locus of centrifugal force 10a, which contains a set of conical discs 14 having distributing holes 14a overlying the holes 13b. The water and solid impurities separated from the oil between the discs flow out as the heavier constituent through discharge channels 15 which, as shown in Fig. 2, are formed and dimensioned to provide minimum resistance to flow. The separated oil flows inwardly between the discs and discharges as the lighter constituent through passages 16 which are likewise formed and dimensioned to afford the least possible resistance to flow. The passages 15 and 16 are provided with radial wings 15a and 16a, respectively, to prevent slippage of the discharging liquids in the passages.

The oil from the discharge passages 16 is conducted through pipe 18 to the bowl 19 of the second stage centrifuge. The pipe 18 is connected to the oil discharge passage 16 through an air-tight connection which may be of any conventional form. As shown schematically, it includes part of the flexible seal 12 and a lower flexible seal 18a. Intermediate its ends the pipe 18 extends through a cooler 18b, to reduce the temperature of the oil as previously described. At its discharge end, the pipe 18 is connected to the inlet of bowl 19 through a flexible seal 12a. The bowl 19, which is of the clarifier type, has a central distributor 20 provided with radial wings 20a, and the oil flows under the bottom of the distributor into the separating chamber or locus of centrifugal force 19a at a region outside a set of conical discs 21. Thus, the oil must flow inwardly through the disc spaces and along the entire radial extent of the discs in order to reach the oil discharge passage 22. During this inward flow, solid impurities remaining after the first separation are separated from the oil between the discs 21 and collect in the outer part of the bowl. The purified oil is conducted away by a stationary pipe 23 having an air-tight connection with the discharge passage 22, such connection, as illustrated schematically, including part of the flexible seal 12a and a lower flexible seal 23a.

By thus dimensioning the oil and water discharge passages in the first-stage bowl 10, and by providing these passages with the radial wings 15a and 16a, the position of the boundary surface between the oil and water in the bowl 10 may be maintained substantially constant. Even when this improved separator is used, however, the feed of liquid to the separator should be kept as constant as possible, and it is therefore advisable to pump the oil into the separator by means of a pump having a fixed volumetric capacity, corresponding to the capacity of the separator. For example, a gear wheel pump may be used, the speed of which is so adjusted as to obtain the desired throughput.

The method and apparatus of the invention may be used to purify boiler oil not only for use as diesel engine fuel but also for use in fueling gas turbines. As it is very important that fuel oil for gas turbines is not in any way aerated, the centrifuges to be used for the treatment of such oil should be provided with inlet and outlet pipes for the oil which are hermetically connected to the bowl, so that the oil is not exposed to the influence of the air. Also, so-called paring discs can be used for this purpose. Since centrifuges of the type in which the bowl inlet and outlet connections are sealed against admission of air to the product are well known in the art, I have merely illustrated the sealing arrangements schematically in Fig. 1.

I claim:

1. A method of purifying boiler oil to a degree sufficient for its use in diesel engines and gas turbines, which comprises heating the oil to a temperature at which any emulsions thereof are broken, then feeding the oil to a first-stage locus of centrifugal force and there separating from it water and a substantial part of the solid impurities, continuously and separately discharging from the locus said water with its contained impurities, as a heavier component, and the oil as a lighter component, feeding the discharged oil to a second-stage locus of centrifugal force and there passing it inwardly through a set of superimposed disc spaces and along the entire radial extent of said spaces from their outer to their inner edges, collecting and retaining in the outer part of the second-stage locus the remaining solid impurities separated from the oil during its inward flow through the spaces, discharging the purified oil from the second-stage locus, and cooling the oil to an asphalt-precipitating temperature during its passage from the first-stage to the second-stage locus, whereby precipitated asphalt substances resulting from said cooling are separated from the oil in said disc spaces and carry with them at least some of said remaining solid impurities.

2. A method of purifying boiler oil to a degree sufficient for its use in diesel engines and gas turbines, which comprises heating the oil to a temperature at which any emulsions thereof are broken, then feeding the oil to a first-stage locus of centrifugal force and there separating from it water and a substantial part of the solid impurities, continuously and separately discharging from the locus said water with its contained impurities, as a heavier component, and the oil as a lighter component, feeding the discharged oil to a second-stage locus of centrifugal force and there passing it inwardly through a set of superimposed disc spaces and along the entire radial extent of said spaces from their outer to their inner edges, collecting and retaining in the outer part of the second-stage locus the remaining solid impurities separated from the oil during its inward flow through the spaces, discharging the purified oil from the second-stage locus, and maintaining the oil out of contact with air during its flow to and from said centrifugal loci and during the separations therein.

GUSTAV HARRY ANDERSSON.

REFERENCES CITED

The following references are of record in the file of this patent:

UNITED STATES PATENTS

| Number | Name | Date |
|---|---|---|
| 1,412,738 | Heller | Apr. 11, 1922 |
| 1,749,291 | Lindgren | Mar. 4, 1930 |
| 1,749,764 | Forsberg | Mar. 11, 1930 |
| 1,831,500 | Lindgren | Nov. 10, 1931 |
| 2,139,715 | Bergner | Dec. 13, 1938 |
| 2,223,999 | Miller | Dec. 3, 1940 |
| 2,261,724 | Holm | Nov. 4, 1941 |
| 2,365,256 | Edvarsson | Dec. 19, 1944 |
| 2,373,349 | Serrell | Apr. 10, 1945 |
| 2,467,742 | Hanno | Apr. 19, 1949 |